United States Patent [19]

Christensen et al.

[11] Patent Number: 5,189,566
[45] Date of Patent: Feb. 23, 1993

[54] METHOD AND APPARATUS FOR RECOVERING DATA

[75] Inventors: Thomas C. Christensen; Weldon M. Hanson; James J. Mosser; Donald E. Vosberg, all of Rochester, Minn.

[73] Assignee: International Business Machines Corporation, Armonk, N.Y.

[21] Appl. No.: 494,047

[22] Filed: Mar. 15, 1990

[51] Int. Cl.⁵ ............................................. G11B 5/09
[52] U.S. Cl. ........................................... 360/53; 360/62
[58] Field of Search .................... 360/46, 53, 62, 31

[56] References Cited

U.S. PATENT DOCUMENTS

| 4,089,029 | 5/1978 | Castrodale et al. .................. 360/99 |
| 4,516,165 | 5/1988 | Cunningham et al. .............. 360/53 |
| 4,821,125 | 4/1989 | Christensen et al. . |

FOREIGN PATENT DOCUMENTS

| 0339874 | 4/1989 | European Pat. Off. . |
| 0357889 | 6/1989 | European Pat. Off. . |

OTHER PUBLICATIONS

Patent Abstracts of Japan–Publication No. 62137772 Entitled "Reading Error Recovery Method for Magnetic Memory Subsystem".
Patent Abstracts of Japan–Publication No. 63155473 Entitled "Magnetic Disk Controller".
Patent Abstracts of Japan–Publication No. 01253802 Entitled "Magnetic Recording Device Having Read Error Recovery Function".
Patent Abstracts of Japan–Publication No. 02027572 Entitled "Alternate Processing System for Optical Disk Device".

Primary Examiner—Vincent P. Canney
Attorney, Agent, or Firm—Richard E. Billion

[57] ABSTRACT

Disclosed is a method for recovering data from a portion of a magnetic surface that contained a read error. After a read error is encountered a magnetic transducer undergoes a head state change. The head state change is accomplished by either writing to a reserve area of the magnetic surface and or reading a portion of the magnetic surface and then rewriting to that portion of the magnetic surface. After the magnetic transducer undergoes a head state change, the portion of the magnetic surface that contained the read error is reread.

1 Claim, 6 Drawing Sheets

METHOD AND APPARATUS FOR RECOVERING DATA

FIELD OF THE INVENTION

This invention pertains to magnetic read-write storage devices and more particularly to a method for recovering data from a disk.

BACKGROUND OF THE INVENTION

Basically, rotating memory includes at least one disk capable of storing magnetic data. A magnetic device that includes a gap typically is flown over the surface of the magnetic disk. Current is passed through coils in the magnetic device to produce magnetic lines of flux at the gap of the magnetic device which in turn magnetizes portions of the disk surface. An actuator arm includes the magnetic device and is used to move the magnetic device to various positions over the surface of the disk.

The magnetic device is also used to sense the magnetized portions of the disk. This is commonly called reading the data from the disk. The actuator arm moves the magnetic device to a selected area of interest that contains data needed for a particular computation by a computer. The magnetized portion of the disk produces flux lines or a magnetic field near the surface of the disk. As the magnetic device is flown or passed near the surface of a spinning disk, a voltage is induced within the coils of the magnetic device by the changing magnetic field generated by the rotating disk. This voltage is used to detect transitions in the magnetic field on the surface of the disk. These transitions represent the data stored on the disk.

In some instances, an error in the data read from the disk is detected which in turn triggers some corrective action. An error detected while the data is being read from the disk is commonly referred to as a read error. A soft read error is an error that is possible to correct. In many instances, the correction of the read error is handled without interrupting the computer system which is beyond the rotating disk storage device. The soft read error would also be corrected before the user could become aware of a soft read error.

In all instances, when a read error is encountered, a multistep procedure is attempted called a data recovery procedure. When the steps in the data recovery procedure are unable to correct a read error, then the read error is termed a hard error.

Hard errors mean data has been lost. Once data is read with a high DRP count or lost from a particular portion of a disk such as a sector, the area is reallocated to another spare magnetizable portion on the disk drive. During the process of reallocation, errors may be recovered. Other hard errors may be ultimately recoverable but only after returning the disk drive to the factory. This procedure is time consuming for the people or the system relying on a disk drive and is also expensive for the manufacturer of the disk drive. Thus, sending a disk drive back to the factory to recover errors is usually done only in the rare instance when large amounts of important data are lost. Since read errors are undesirable, there always is a need for any step, process or apparatus which enhances a disk storage device's ability to recover any read errors without allowing them to become hard. Any enhancement in the ability to recover read errors means that the rate of occurrence of hard errors will be reduced which in turn minimizes any loss of data inconvenience for customers relying on the disk drive, and expensive data recovery at the factory.

In the past, various steps have been used to recover data with data recovery procedures. U.S. Pat. No. 4,821,125 issued to Christensen et al. discloses a data recovery procedure at column 8, line 32 and following. The data recovery procedure is also depicted in FIG. 6 of that patent in flow chart form. Basically, the Christensen et al. patent teaches rereading the portion of the disk containing the error several times and then changing a channel characteristic and then again rereading the portion of the disk several times in an attempt to recover data which is in error. The disk is first reread without error correction code. After this certain channel characteristics are changed. The portion of the disk is reread with error correction code, then the head is offset from the track both inwardly and outwardly, then a reread is attempted after changing the variable delta-V detection parameter, and then a second error correction code is used during a reread. The Christensen et al. patent discloses one particular error recovery procedure and the specific step of changing the variable delta-V to recover errors.

There are many different error recovery procedures that feature all sorts of steps other than those shown in the Christensen et al. patent. Other steps that are known in the art of data recovery include electronically varying the timing window used to detect transitions. The timing window can be shifted forward or backward from its on center position to detect transitions which occur either slightly ahead or slightly behind the time which they are supposed to occur in the window.

Another data recovery procedure for recovering read errors is disclosed in U.S. Pat. No. 4,516,165 issued to Cunningham et al. and entitled "Error Recovery Procedure Using Selective Erasure". The Cunningham et al. patent discloses reading and storing the data on the two adjacent tracks on either side of the track containing the error. The adjacent tracks are then each erased and the track containing the error is reread in an attempt to recover the error. This technique allows recovery of data from a track which exhibits consistent errors either because the track was partially occluded by adjoining tracks through writing over a portion of the track of interest due to track misregistration or the data on adjoining tracks was phased and of such a frequency that the lateral readback amplitudes were excessive.

The techniques for data recovery listed above are useful for certain applications. As mentioned previously, there is always a need for a step or apparatus which enhances the ability of a disk drive or magnetic storage unit in recovering data in a track or sector that is difficult to read.

SUMMARY OF THE INVENTION

The invention is a new technique for enhancing the ability of a disk drive to recover data which is in error. Basically this technique is conducted on a portion of the disk surface which is not being used to save information. In other words, an area which can be written on without the fear of losing data, servo or other information vital to the operation of the disk drive. Placing reserve sectors in a disk drive is common. Spare sectors are provided as a backup in the event a sector or sectors are determined to be magnetically defective. Generally, each cylinder is provided with a number of spares. In normal operation, if a sector is determined to be defective data is written into the spare sector rather than in the flagged sector.

The technique disclosed includes the steps of writing data on a portion of the disk free of vital information and then rereading the sector that had the error. By writing with the same head into an unused area of disk, the read performance of the head has been shown to improve and it is believed that the state of the head is changed.

Head instability is generally regarded as a problem in the field of magnetic storage. However, the disclosed technique takes advantage of head instability. Data has been taken that shows that a head's read error rate performance can vary after writing with a head by up to 1000 times. When the sector exhibiting read errors is reread with a different reset head read state, data which previously could not be read now has a statistically improved chance to be read correctly.

Advantageously, use of this technique has been found to improve the soft error rate up to three orders of magnitude. Hard error rates for a file with this technique have improved as well. The better error rate performance also improves file throughput. In addition, the method does not require additional hardware and also requires very little in terms of additional time when compared to other steps in a data recovery procedure. The method can also recover data that commonly used single burst error correction codes can not.

BRIEF DESCRIPTION OF HE DRAWINGS

For a better understanding of the present invention, reference may be made to the accompanying drawings, in which.

These drawings are not intended as a definition of the invention but are provided solely for the purpose of illustrating the preferred embodiment of the invention described below.

DETAILED DESCRIPTION OF THE PREFERRED EMBODIMENT

Figure 1:
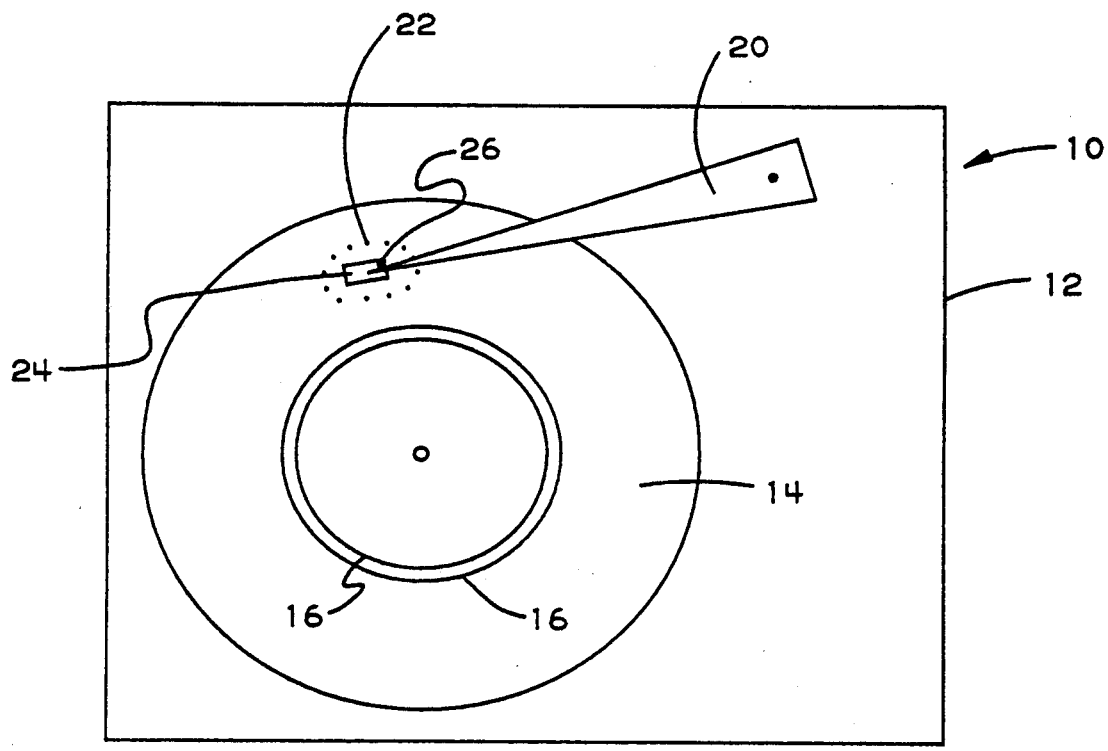
FIG. 1 is a top view of a disk and an actuator arm for accessing the various areas of the disk.

FIG. 1 shows a top cut away view of a disk drive or magnetic storage device 10. The magnetic storage device 10 includes a housing 12. Rotatably attached to the housing is a disk 14 which has a plurality of concentric tracks 16. Now referring to FIG. 2, each of the tracks 16 includes a number of sectors 18. Each of the sectors contain data in the form of magnetized portions of the magnetic surface of the disk 14. Now referring back to FIG. 1, also rotatably attached to the housing 12 of the disk drive 10 is an actuator arm 20. Attached to the actuator arm 20 is an assembly 22 which includes a slider 24 and a magnetic transducer 26. The actuator arm 20 is rotated to position the transducer 26 of the slider 24 over a selected track 16. The selected track will include the sector or sectors 18 that has the desired information stored therein.

Figure 3:
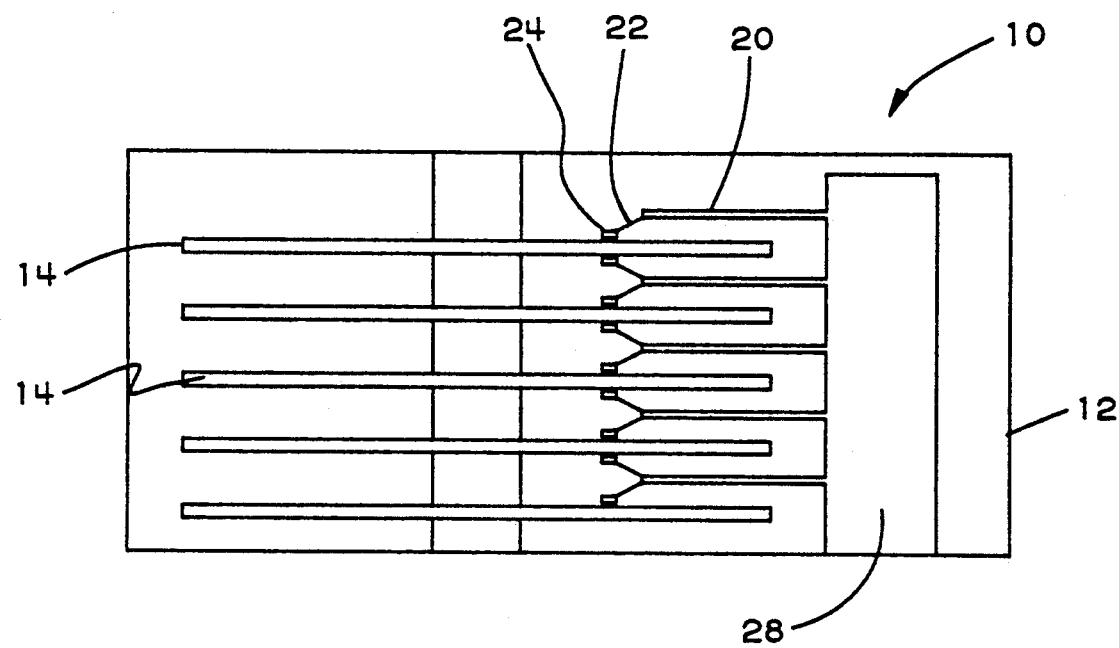
FIG. 3 is a side view of a disk drive with a plurality of disks.

Now referring to FIG. 3, a magnetic storage device 10 may have a plurality of disks 14. A head or of magnetic transducer 26 is associated with each surface of the disk 14. The heads 26 are attached to a comb structure 28 which swings or moves each of the heads to the same position on a particular disk, relative to the center of the disk. In other words, the concentric track 16 of one disk 14 at a particular radius will have a corresponding track on another disk 14 at the same radius. All of the tracks 16 on the disk 14 at a particular radius from the center of the disks form what is commonly known as a cylinder.

For each cylinder a number of the sectors 18 are designated as spare sectors 18'. The spare sectors are normally designated for use when one or more of the sectors 18 in a cylinder are determined to be magnetically bad. In other words, the spare sectors 18' are used as backups to the sectors 18 normally designated for storing data. Rather than write to a sector where soft errors or hard errors will occur, data is written to a spare sector 18' so as to preserve data integrity. All of the spare sectors 18' for a particular cylinder typically are located on only one surface of one disk in the cylinder. Different disk drive designs may physically locate the spares on more than one surface.

A reserve area is also provided at the outer diameter of each of disks 14. This reserve area is space for data and space necessary to perform the overhead functions of the disk drive 10. The reserve space is used for storing interface data and for testing of the write function for each of the magnetic transducers or heads 26 as well as other diagnostic functions and file processor information storage.

Figure 4:
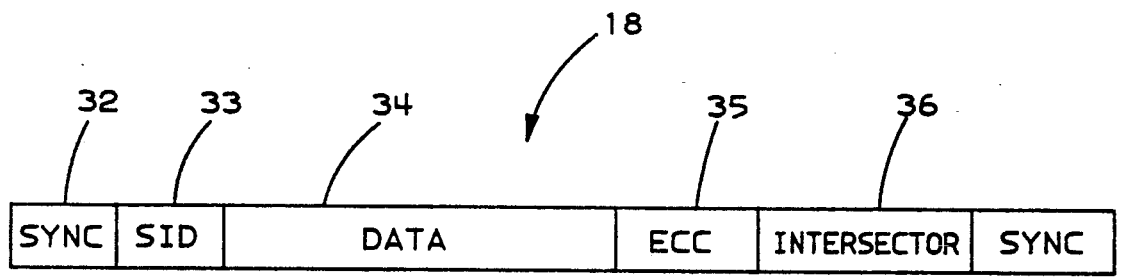
FIG. 4 is a depiction of the sector organization on a disk that has an intersector gap.

Now turning to FIG. 4, the sector 18 is described in more detail. It should be noted that there are many ways of arranging the sector 18 and that this is one particular arrangement. The sector 18 begins with a sync zone 32 which contains information for properly synchronizing the data channel as it reads data. The next portion of the sector 18 is a sector identifier 33 which identifies the particular sector. Next is a data portion 34 which contains data which is stored. Following the data portion 34 is a portion containing error correction code 35. Error correction code in portion 35 is used to determine errors in the data as read. The next portion is an intersector gap 36. The intersector gap 36 is a write recovery field normally for prevention of accidental erasure of data resulting from turning off head write current or rotational speed tolerances. Following the intersector gap 36 is the sync zone for the next sector.

Head instability is generally considered a problem in the field of magnetic storage. The instability varies the probability of data or servo signals being read with an error. This instability generally has been regarded as bad in the industry since the head is considered of less quality because the state of the head is not constant and may change during the write and read operations. As a result of this head instability, the maximum areal density or bits of data stored per square inch of the disk. is generally lowered during the design stage so that the soft error rate in the final version of the disk drive is within acceptable limits.

Figure 2:
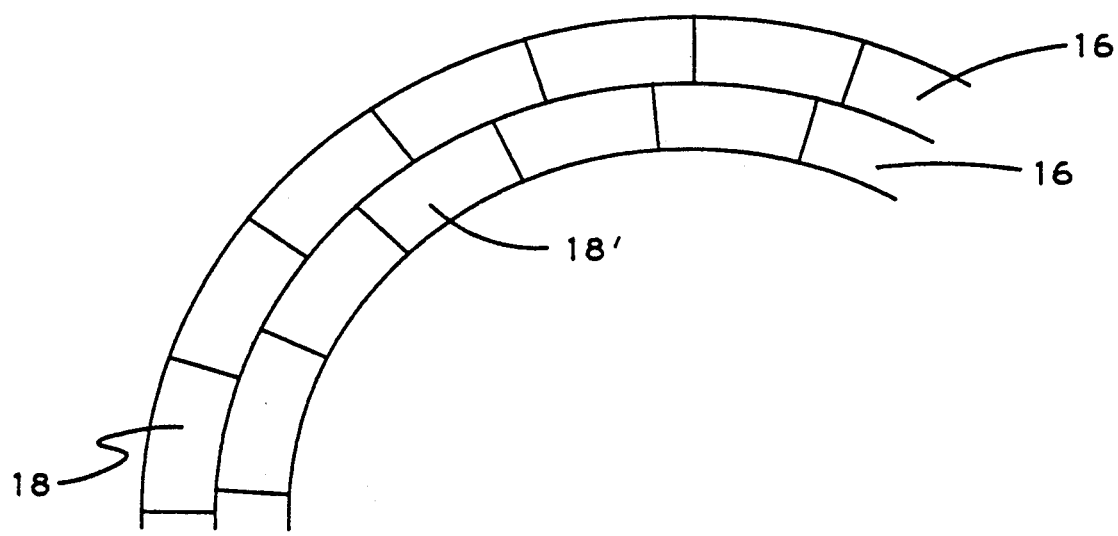
FIG. 2 is a representation of the sectors within a track on a disk.

Now referring to both FIG. 1 and FIG. 2, the basic operation and detection of an error on a sector 18 will be discussed. The actuator arm 20 is positioned over a track containing a desired sector or sectors 18 on which data is desired. The magnetic transducer or head 26 is flown over the track and reads the various sectors 18. During the read operation, one of the sectors 18 is determined to have an error. Use of the error correction code in portion 35 of the sector 18 indicates a read error in the sector 18.

Figure 6:
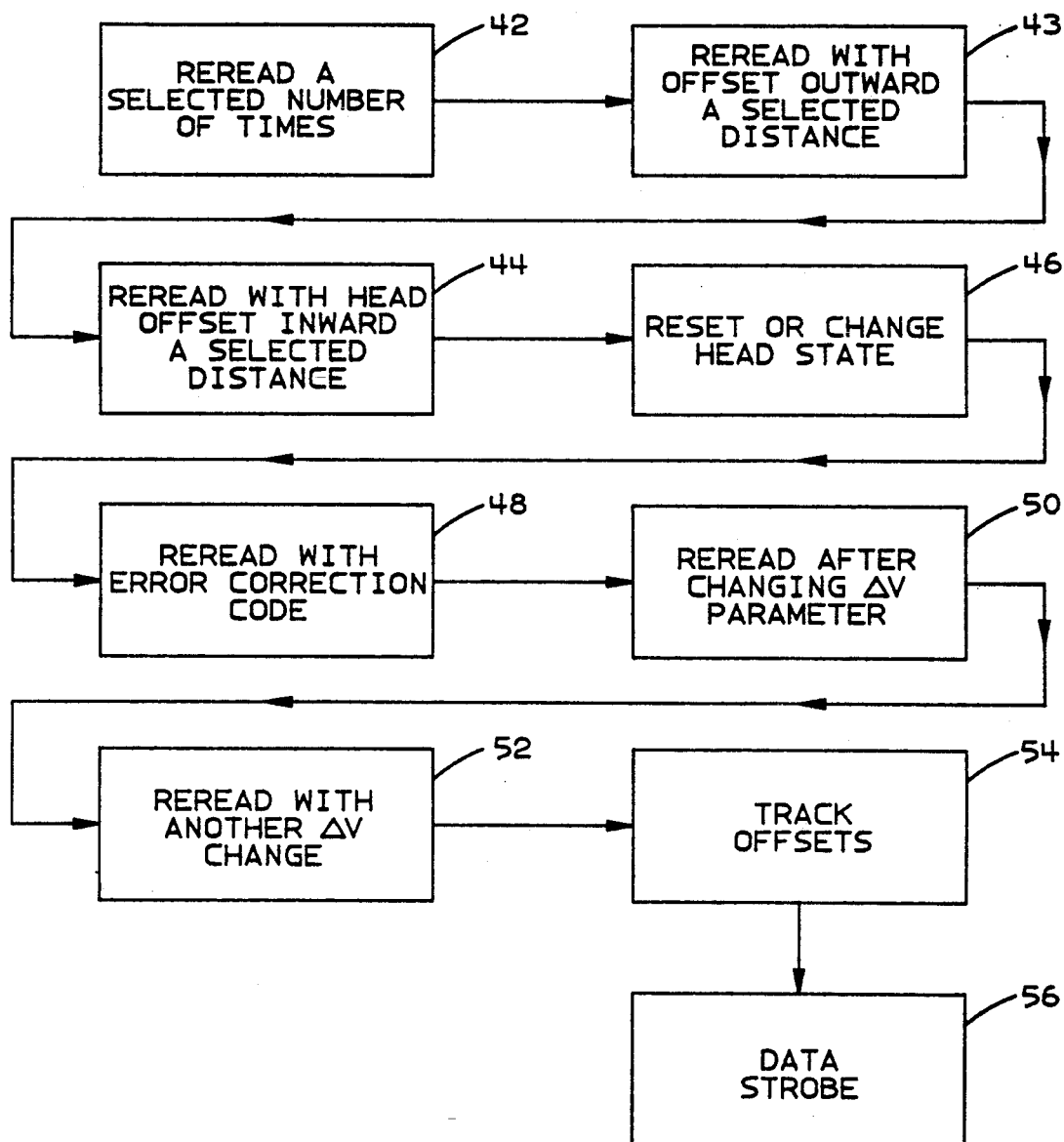
FIG. 6 is a flow chart showing the steps for a data recovery procedure which includes the steps shown in FIG. 5.

Detection of a read error triggers implementation of an error recovery procedure such as the one shown in FIG. 6. The data recovery procedure is implemented to attempt to correct these errors and prevent them from becoming a hard error or an error that is unrecoverable within the disk drive 10. It should be noted that an error recovery procedure as shown in FIG. 6 is a multi-step procedure that is pursued until the error is corrected and the procedure is terminated or continued through the entire routine of procedures to identify a hard, unrecoverable error. The initial steps in an error recovery procedure are typically the fastest or most effective to implement. The steps then typically become progressively more time consuming to implement. A block of error recovery procedure steps may be repeated several times before the error is termed a hard error which is unrecoverable from within the disk drive 10.

As shown in FIG. 6, after an error is detected by use of the error correction code in portion 35, the sector 18 is reread a number of times without ECC which is denoted as step 42. If unsuccessful in recovering the data, the head is offset a selected distance outward and the sector is reread as depicted by step 43. The next step 44 is to offset the head inward a selected distance and reread the sector. The next step 46 is to reset the head and to reread the sector 18. This step, 46, is the basis for this application and is detailed in the following paragraph. The next step 48 is to use error correction code and then reread the sector. The next two steps 50 and 52, are related to adjusting the rate at which the voltage must change in a detected pulse before it is considered a valid pulse. Track offsets similar to those shown in steps 43 and 44 are then tried as shown by step 54. The final step 56 shown in FIG. 6 is to reread sector 18 after electronically shifting the window into which a transition is to fall both forward and backward. This is shown as the data strobe step 56 in FIG. 6. Shown in FIG. 6 are only the initial steps in one particular data recovery procedure. It should be noted that the steps can be repeated several times in an attempt to recover the data before the error is termed a hard error. Different data recovery procedures may use different steps or place steps in different orders than the steps shown in the data recovery procedure of FIG. 6.

Figure 5:
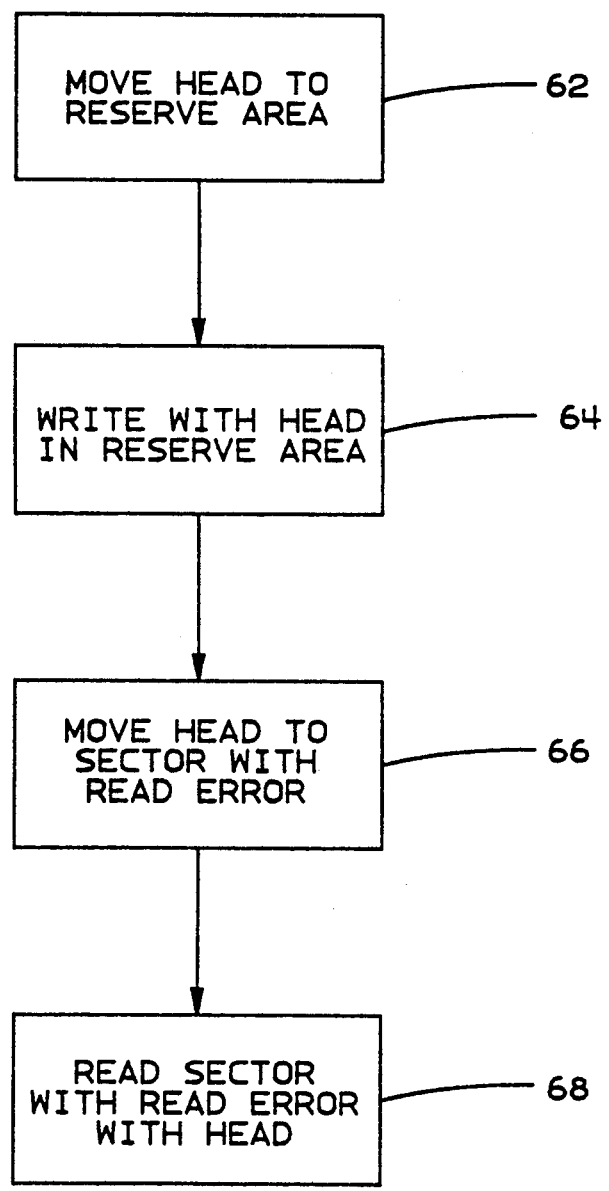
FIG. 5 is a flow chart showing the steps in the head state changing process disclosed in this application.

Now referring to FIG. 5, the step of resetting the head, depicted as step 46 in FIG. 6 is further detailed. The head is passed over a reserve area, as depicted by step 62. The reserve area can be one of several areas where data or servo information or information vital to the operation of the disk is not contained. The reserve area is not necessarily positioned in one particular location relative to the other sectors 18. Now returning to FIG. 5, a write operation is performed with the head 26 over the reserve area as depicted by step 64. Once the head has been used in a write operation it has been shown that the read performance of the head is changed. The head state change may improve the read performance of the head 26. The next step is to position the head over the sector which has the read error, as depicted by the reference number 66. Finally the sector 18 is reread with the reset head in an attempt to read the sector 18 correctly.

There are several different embodiments of the step of resetting the head which is depicted as step 46 in FIG. 6 and is the subject of FIG. 5. The difference in the embodiments is related to where the reserve area is found.

A first embodiment moves the head 26 to the reserve area located on the outer diameter of the disk 14. The reserve space is for the overhead functions of the disk drive 10 such as testing the write circuit and various other diagnostic items. When the head 26 is moved from the track 16 on which the sector 18 with the read error is located, the actuator arm 20 must move the head 26. The actuator arm 20 moves the head 26 to the reserve area before writing to reset the head and then moves it back again to the sector 18 with the read error. The sector with the read error is then reread.

A second embodiment is very similar to the first embodiment. In this embodiment, the spare sectors that are provided for use as a substitute when a defective sector is found are used as the reserve area for the head state change of the head 26. Usually a number of spare sectors are provided per cylinder. The physical location of these spares varies with each file design. For example, many files place all the spares for one cylinder on one surface. In this case, the head state change step could only be used for read errors occurring on the surface having the spares since the particular head that reads the sector with the read error is the one that needs to be written.

A different design of the placement of the spares would make this embodiment more effective. For example, the file would be designed so that the spares for each cylinder occurred on each of the surfaces within the cylinder. In such a case, each track would contain a spare which may or may not be used. If unused, the resetting step would require no movement on the part of the actuator arm 20. The head could be reset on the spare in the particular track 16 having the sector 18 with the read error. One revolution would assure that the head is passed over the spare reserve area. If the spare was used on the track in such a design, the actuator arm 20 would only have to move the head to an adjacent track 16 to use its spare in the head reset step. Other designs of physical placement of the spares could also be used and result in different schemes. In addition, if a defective sector occurred within the track 16 having the sector with the read error. the defective sector could also be used as a reserve area.

A third embodiment would be to use the intersector gap 36 as the reserve area in the head state change step. After an error is detected, then the head would rewrite in one of the intersector gaps 36 rereading before the sector 18 containing the read error. The advantages with this embodiment is that no accessing to a reserve area on another track is necessary to change the head state. This minimizes any effect on file throughput because the step causes no more loss of time than a regular reread.

It should be noted that the reserve area can be any area on the surface of the disk which is free of data or other information necessary to operate the disk. It could also be a portion of the track that is set aside for this purpose in some designs.

Another embodiment would be to use a data sector in changing the state of the head. Rather than using a reserve area to write to, a data sector could be used. On one pass a data sector could be read. The data obtained could then be written back into the same sector. A sector that is read and rewritten into would be a sector in the same track as the sector having the read error. Preferably. The sector from which data is read and rewritten to would be near the sector having the read error.

It should also be noted that the same techniques could also be used in a magnetic storage device that used other than concentric tracks. For example, writing to reserve areas or to a data track could be used in a device having a spiral track.

It is also further contemplated that the technique of performing a head state change may not be triggered only in response to the detection of a read error in a sector. For example, a head state change action may be triggered when an indicator of the head's soft error rate performance is determined to have changed. This could be accomplished with an amplitude or resolution measurement. The head state change would then bring the indicator into the normal operating range. Another method might be to implement a head state change on a periodic basis.

It is also noted that it may be possible to perform a head state change by exciting the head with a small amount of current or current of high frequency which would not overwrite or otherwise disturb the existing data. This could potentially be done without accessing to a reserved area.

In addition, with a certain type of head, a magneto resistive (MR) head, it may be possible to perform a head state change without passing the head over a reserve area or reading from a sector and rewriting to the same sector.

This could be done by changing the bias of the MR stripe in a similar manner to alter the readback state of the MR stripe. For MR head designs incorporating the MR stripe within or in close proximity to the write gap of the head, the MR stripe's read state might be altered by energizing the write coil in one of the methods previously described.

The process of a head state change 46 of the head has many advantages. The process requires very little time to accomplish when compared to other steps in an error correction procedure such as the one shown in FIG. 6. Resetting the head takes less time than the time for running the error correction code. The process also can decrease the soft error rate read performance anywhere from approximately ten times to a thousand times for certain heads. The improved error rate has many side benefits. First of all, the maximum areal density does not have to be derated as much to yield an acceptable soft error rate. The improvement in soft error rate also adds additional margins in file operation to protect file data integrity.

The present invention and the best modes for practicing it have been described. The foregoing description is illustrative only and that other means and techniques can be employed without departing from the full scope of the invention described in the appended claims.

What is claimed is:

1. A method of recovering data from a magnetic storage device which has a disk for storing data, said disk having at least one track in which includes a plurality of sectors which include data, said storage device also having a transducer for reading and writing data to the surface of the disk, said method for recovering data comprising the steps of:

detecting a read error in the data in a first sector of said plurality of sectors within said track;
   reading data from a second sector of said plurality of sectors within said track;
   rewriting the data from said second sector to said second sector; and
   reading the data in the first sector.

* * * * *